March 21, 1933. T. B. LAVELLE 1,902,133
AIRCRAFT CONTROL MEANS
Filed Nov. 24, 1931 2 Sheets-Sheet 1
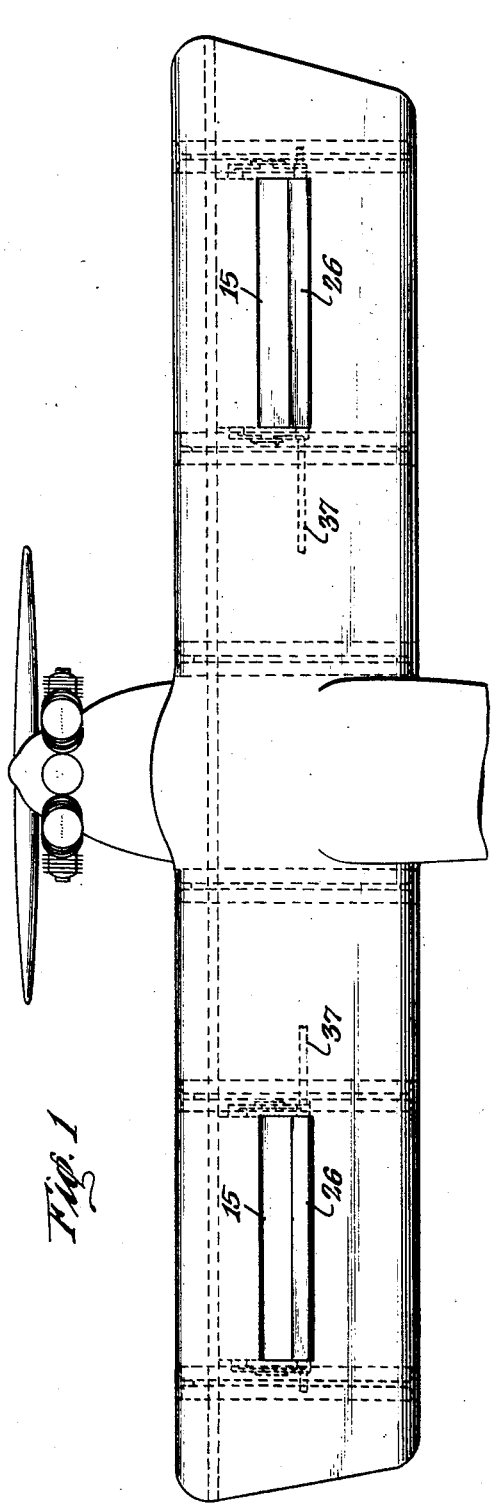
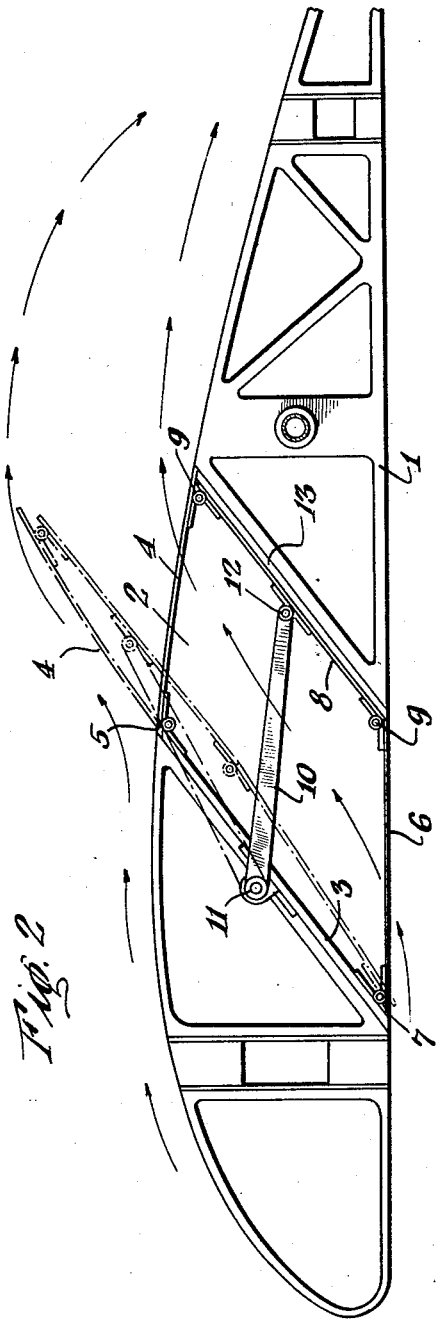
INVENTOR
Thomas B. Lavelle
BY
Frederick W. Barker
ATTORNEY

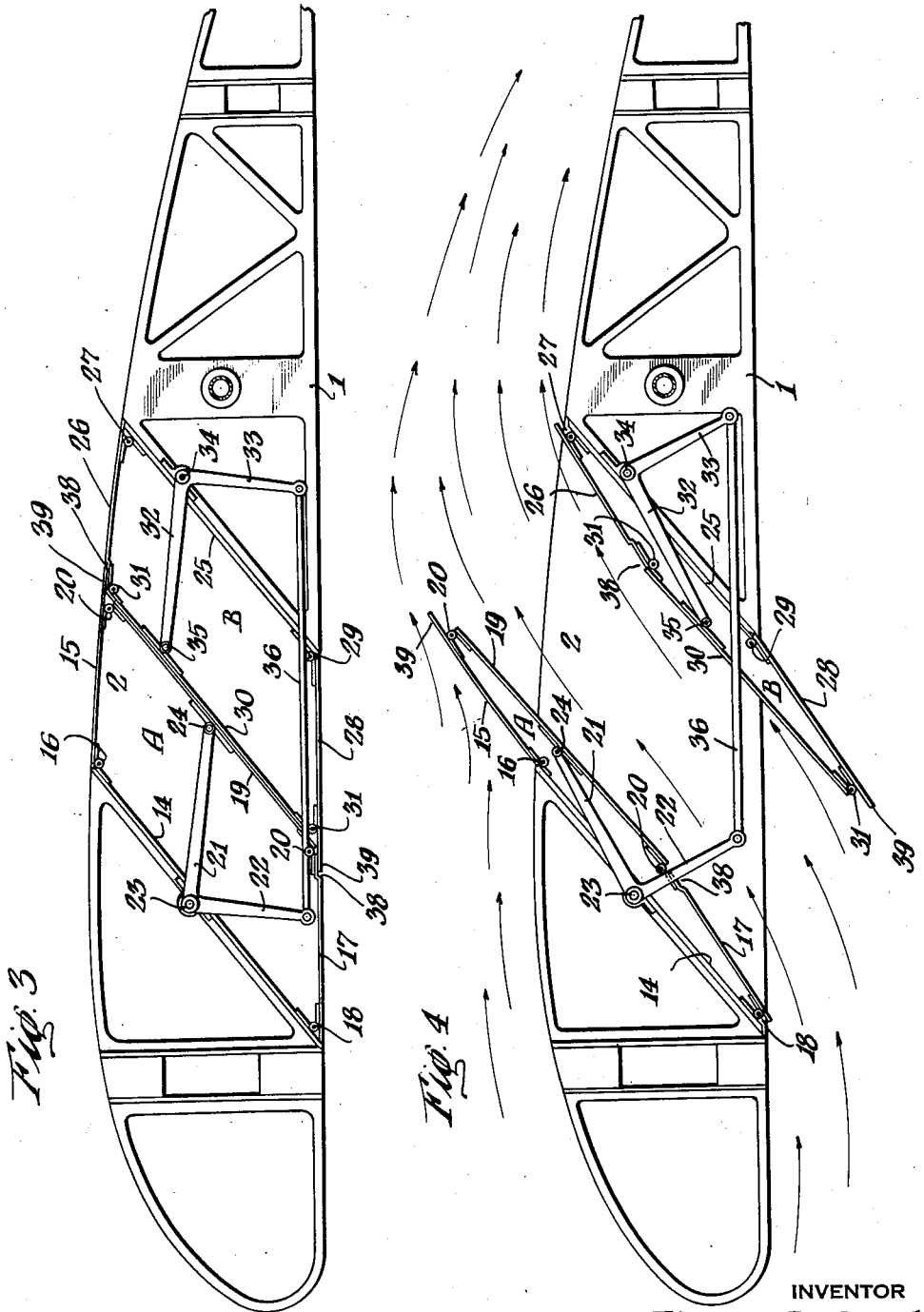

Patented Mar. 21, 1933

1,902,133

UNITED STATES PATENT OFFICE

THOMAS B. LAVELLE, OF HEMPSTEAD, NEW YORK

AIRCRAFT CONTROL MEANS

Application filed November 24, 1931. Serial No. 576,983.

This invention relates to aircraft and my improvement is directed to novel means for creating a controlled spanwise slot, through an airfoil, having balanced opening and closing means, for the purpose of modifying the behavior of an aircraft in operation. For example when these slot creating means are provided respectively in the right and left airfoils, or airfoil portions, and are independently operable, they may be used for lateral control purposes, but when operated in unison they may be used as means for effecting a loss of lift, also for braking the speed of an airplane. The controlled spanwise openings are also of a character which renders them capable of employment with the airfoils or vanes of horizontally operated rotors, such as are used upon autogyros, for providing a lift diminishing effect.

My said improvement comprises the employment of a movable portion in an airfoil, composed of hinged members which are capable of collapsing to create a slot or of expanding to close said slot. When this movable portion is arranged in two sections so as to balance the forces involved in manipulating the slot, they are to be collapsed, respectively against opposite boundaries to create the slot, and they are expanded into mutual conjunction for the purpose of closing the slot, members of the movable sections then forming continuous portions of the airfoil at its upper and lower surfaces. But when the slot creating device is employed as a single section, then it is caused to contract against the forward boundary of the slot, to provide a passageway between itself and its rearward boundary, whilst said section expands toward said rearward boundary to close the slot.

The primary object of the slot creating means is intended to cause a loss of lift by the flow of air upwardly and rearwardly to break the partial vacuum over a portion of the upper surface of the airfoil, and this object is further served by causing the forward section, when contracted, to be projected upwardly and rearwardly above the airfoil, for deflecting the encountered pressures, and by causing the rearward section to be projected downwardly and forwardly below the airfoil, in the manner of a scoop, to direct air pressures upwardly and rearwardly through the slot, in the performance of the vacuum breaking function.

When the slot creating device is used in single or unbalanced arrangement, I prefer that it, being contractible toward the forward wall of the slot, shall extend upwardly above the airfoil when collapsed.

Other features and advantages of my invention will hereinafter appear.

In the drawings:

Figure 1 is a partial top plan view of an airplane whose supporting airfoil is equipped with my improved slot creating means.

Fig. 2 is a partial view of an airfoil, in cross-section, wherein a slot is shown as capable of creation through the medium of the single section or unbalanced arrangement of my device.

Fig. 3 is a similar view wherein the slot device in two sections is shown with both sections expanded to close the slot, and Fig. 4 is a companion view to Fig. 3 showing the two sections collapsed to open the slot.

In said figures let 1 indicate an airfoil having a slot 2 formed therethrough, said slot extending upwardly in a rearward direction.

In Fig. 2 there appears an example of improved means for opening and closing the slot, said means comprising a fixed airfoil member 3, an upper member 4 connected to member 3 by hinge 5, a lower member 6 connected to member 3 by hinge 7, and a rearward plate 8 connected to members 4 and 6 respectively by hinges 9, said plates and members together constituting the slot creating device. A lever 10, journalled at 11 to the member 3, is pivotally connected at 12 to the plate 8, and means are provided, under the control of the pilot, for swinging said lever to thereby collapse these movable parts, as appears in dot and dash lines in Fig. 2 to open the slot, which is thus created between the collapsed parts and the rearward wall 13, or to expand the movable parts, by moving the plate 8 into contact with said wall 13, as appears in full lines in Fig. 2.

The upper and lower members 4, 6, in the slot closed position respectively fill in the gaps left by the slot in the upper and lower surfaces of the airfoil.

It will be observed that in this form of my invention pressure of air is caused to flow through the slot, when open, between the rear plate of the movable parts and the rearward wall 13.

In the example of my invention illustrated in Figs. 3 and 4 the slot opening is created and closed by movable parts in two sections, indicated generally at A and B as being connected respectively to the forward and rearward boundaries. The slot passageway is formed between the sections when they are collapsed.

The section A is composed of the forward boundary indicated at 14, an upper member 15 connected to boundary 14 by hinge 16, lower member 17 connected to boundary 14 by hinge 18, and a rearward plate 19 connected to members 15 and 17 by hinges 20.

A bell crank, having the arms 21, 22, is shown as journalled at 23 to the fixed boundary 14, the arm 21 being pivoted, as at 24, to the plate 19.

The section B is opposed to section A, having supporting member 25 that forms the rear boundary, an upper member 26 connected to member 25 by hinge 27, lower member 28 connected to member 25 by hinge 29, and a forward plate 30 connected to members 26, 28 by hinge 31. A bell crank, having the arms 32, 33, is shown as journalled at 34 to the fixed member 25, the arm 32 being pivoted, as at 35, to the plate 30.

The arms 22 and 33 of the bell cranks are pivotally connected by a link 36, whereby the movements of the bell cranks will be in unison, serving, when rocked in one direction, to collapse both sections for creating the slot opening, and when rocked in the opposite direction to expand both sections for closing the slot.

The shaft of one of the bell cranks may be extended, as shown at 37, in Fig. 1, to provide suitable operating means for control by the pilot.

In the slot closing position of sections A and B the respective plates 19 and 30 thereof are brought into close contacting relation as shown in Fig. 3, and, as will be noted, their parallel relation is maintained in the creation of the upwardly and rearwardly angled slot therebetween as said sections are collapsed for the enlargement of the slot to its widest extent.

The members 17 and 26 are each shown as provided with a recess 38 adapted to receive respectively an extended portion 39 of the members 28, 15, to cover joints between the opposing members when the sections are fully expanded.

The pressure flow of air through the slot opening provided between the collapsed sections A, B has the effect of facilitating the expansion movement thereof in the slot closing operation, thereby reducing the amount of effort required to be exerted by the pilot in closing the slot.

Although for lateral control purposes the respective slots in the right and left airfoil portions are to be independently controlled it is obvious that if the slots be provided with means whereby they can be opened or closed together then they may well serve the purpose of a brake to reduce the speed of the aircraft.

For the dual functions stated, either suitable respective operating means may be employed, or two sets of slot creating and closing means may be provided in the airfoils, one set being adapted for use as lateral control means, and the other set as braking means, each set having its own actuating means.

Variations within the spirit and scope of my invention are equally comprehended by the foregoing disclosure.

I claim:

1. The combination with an airplane of a supporting airfoil having a slot therethrough respectively near each opposite end thereof, and respective closure means for said slots including two plates whose surfaces lie contactingly in opposed relation in the slot closed position of the closure means, said plates being movable away from each other in the slot opening movement.

2. The combination with an aircraft of an airfoil provided with a rearwardly upward slot therethrough, and closure means in two hinged sections that are movable toward their respective boundaries to open a clearance therebetween, and movable from their respective boundaries to close the opening.

3. The combination with an aircraft of an airfoil provided with a rearwardly upward slot therethrough, and closure means in two hinged sections that are movable toward their respective boundaries to open a clearance therebetween, and movable from their respective boundaries to close the opening, the forward section, when in open position of the slot, projecting above the airfoil, and the rear section when in open position, projecting below the airfoil.

4. The combination with an aircraft of an airfoil provided with a rearwardly upward slot therethrough, and hinged means located respectively at the opposite boundaries of said slot, said means being expansible to meet in opposed conjunction for slot closing purposes, and collapsible toward their respective boundaries in providing a clearance therebetween.

5. The combination with an aircraft of an airfoil provided with a rearwardly upward slot therethrough, and hinged members constituting quadrilaterals located respectively at the opposite boundaries of said slot, said quadrilaterals being expansible to meet in opposed conjunction for slot closing purposes, and collapsible toward their respective boundaries in providing a clearance therebetween, the forward quadrilateral when collapsed projecting above the upper surface of the airfoil, and the rearward quadrilateral when collapsed projecting below the under surface of said airfoil.

6. The combination with an aircraft of an airfoil having controllable and movable parts that are movable in parallelism, for creating and closing a slot, the walls of said movable parts when in open position forming the slot passageway.

7. The combination with an airplane of a supporting airfoil having a clearance therethrough respectively near each opposite end thereof, and respective closure means for said clearances, said closure means each comprising connecting members hinged at the forward side of a clearance, in relative, substantial parallelism, said members being expansible to close the clearance, and contractible in a rearwardly upward direction to open the clearance, thereby providing an upwardly and rearwardly projecting plane for deflecting forwardly encountered air pressures above the clearance.

New York, N. Y., November 2, 1931.

THOMAS B. LAVELLE.